Dec. 30, 1930.                    E. W. STEVENS                    1,787,178
                              TOOL RETAINING COUPLING
                                Filed May 2, 1924
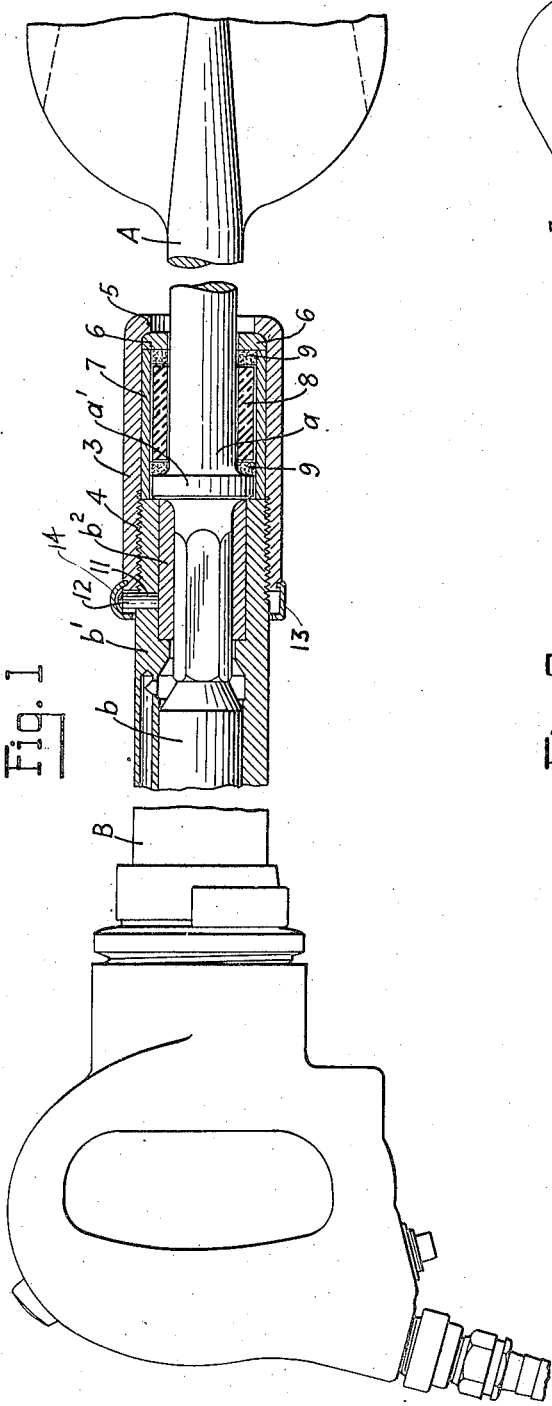
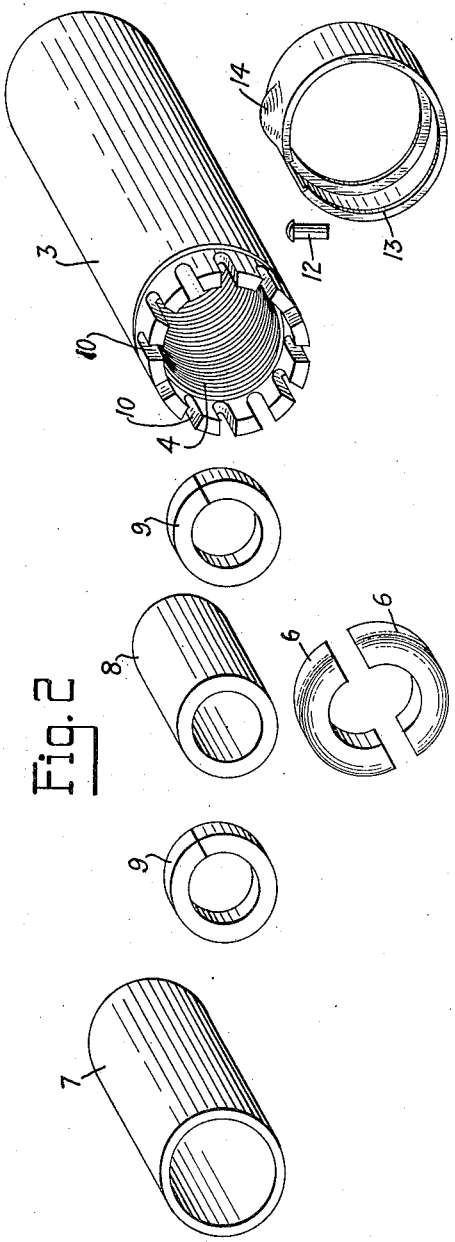
INVENTOR
Edward W. Stevens
BY his ATTORNEY
Ira L. Nickerson Patented Dec. 30, 1930

1,787,178

UNITED STATES PATENT OFFICE

EDWARD W. STEVENS, OF DETROIT, MICHIGAN, ASSIGNOR TO CHICAGO PNEUMATIC TOOL COMPANY, OF NEW YORK, N. Y., A CORPORATION OF NEW JERSEY

TOOL-RETAINING COUPLING

Application filed May 2, 1924. Serial No. 710,682.

This invention relates to coupling devices adapted for use with percussive machines for maintaining the working tool in position to receive the impact of the percussive member and for preventing its accidental dropping out or discharge from the machine when lifted from the work. The invention is particularly designed and intended for use with working tools having collared shanks and provided with working ends of greater transverse dimensions than the collars, but is not limited to such use.

In devices of the class described, cushioning means of some sort is ordinarily provided to be engaged by the collar of the tool. Inasmuch as metal springs quickly become crystallized under impact and break, the use of non-metallic cushioning members of rubber or similar material, has increased. Difficulty, however, has been experienced in preventing such cushions from being frayed away when subjected simultaneously to compression and to the movement of at least one of the walls of its compression chamber, as for example the shank of the tool.

Among the objects of the invention are to provide a coupling device which can be assembled readily upon the collared shank of a tool having an enlarged working end, in which the metallic parts are rigidly held against movement while the shock absorbing parts are protected from fraying and excessive wear, and in general to improve prior devices of this character in the interest of more efficient and satisfactory service.

For the purpose of illustrating the invention, one concrete embodiment thereof is shown in the accompanying drawings, in which:

Fig. 1 is a side elevational view partly cut away of a percussive machine and its working tool, with the tool retaining coupling and a part of the cylinder of the machine shown in section; and Fig. 2 shows in perspective the various elements making up the tool retaining coupling.

The embodiment of the coupling chosen to illustrate the present invention is disclosed in Fig. 1 as retaining a working tool A having its shank $a$ provided with a collar $a'$ in operative relation to receive the blows of the impact member $b$ of percussive machine B. In the present instance, the percussive machine B is a pneumatic hammer, within the cylinder $b'$ of which is positioned a bushing $b^2$ receiving the end of the shank $a$ of the working tool A.

The elements forming the coupling are secured in assembled relation to the cylinder $b'$ by an elongate barrel nut 3 provided with screw threads 4 on its interior at one end for threaded engagement with the exterior of the cylinder $b'$ and having an inturned flange 5 at its other or outer end. The openings at the opposite ends of barrel nut 3 are of sufficient size to receive the collar $a'$ of the working tool. Within the barrel nut 3 is provided a removable abutment for the collar $a'$. This abutment preferably is formed in two pieces 6 which together form a split ring fitting the interior of the nut and loosely engaging shank $a$ on the tool, the ring abutting the inturned flange 5 of the barrel nut. Abutment 6 is for the purpose of limiting the movement of the collared shank $a$ within the barrel nut 3 and is held in fixed relation relative to the end of cylinder $b'$ by cylindrical spacer 7 which fits the interior of nut 3 and whose inner diameter is such as to receive the collar $a'$ with a loose sliding fit. Spacer 7 is clamped between the two piece abutment 6 and the end of the cylinder $b'$ when the nut 3 is secured to the latter.

The cushioning or shock absorbing means for working tool A are interposed between its collar $a'$ and abutment 6. For this purpose a cylindrical cushioning member 8 of suitable elastic material, such as rubber or rubber compound, encircles the shank $a$. As the tool shank is capable of movement relative to the adjacent metallic parts with which it has a loose fit, compression of the cushion 8 will force parts of the same into the openings between the metallic parts forming the chamber in which it is confined, whereupon movement of the working tool will quickly fray the exposed ends of the cushion away. To avoid this fraying and excessive wear, non-metallic buffer washers 9 are provided at each end of rubber cushion 8. These washers make a tight fit both with the tool shank $a$ and with the spacer 7, thus practically sealing the chamber in which the cushion member 8 is located. To give the necessary close fit and yet provide sufficient flexibility to allow the washers 9 to be placed upon the shank $a$, the latter are preferably of a good grade of leather cut with a sharp instrument at one point so that when slipped over the tool shank the ends of these split washers make a tight joint and allow no space into which the cushion 8 can be forced under compression.

In assembling the coupling, the barrel is first passed over the collared shank to a position below collar $a'$. The two part abutment 6 is then placed over the shank and slid therealong into the nut. Spacer 7 is then slid over the collared shank and into the nut against abutment 6. One split washer 9 is flexed open and passed over the shank, slid within spacer 7, cushion 8 is forced over the collared shank $a$ and thence within the spacer 7 to be followed by the other buffer washer 9. The barrel nut 3 with the parts thus assembled on the tool shank is screwed upon the barrel $b'$ of the percussive machine until spacer 7 is securely clamped between buffer 6 and the end of the cylinder $b'$.

To prevent nut 3 from loosening, suitable locking means may be provided such as spaced recesses or scallops 10 in the barrel nut, one of which will register with an opening 11 in cylinder $b'$, through which registered openings a locking pin 12 is inserted and held in place by a spring ring 13 having a bulge 14 providing a socket for the head of the locking pin 12.

From the above it will be apparent that the tool retaining coupling herein described is simple to construct, assemble and use, that the metallic parts of the retainer are rigidly held in place and hence are not subject to wear, that the non-metallic parts comprising the buffer members, namely the elastic cushion and its protecting washers, alone are capable of movement, that the wear is almost wholly confined to the tough buffer washers which effectively protect the elastic cushion from fraying by forming a tight seal for the chamber in which the cushion is confined, and that the nature of the elements selected, the manner of their assembly, and their cooperating functional operation produce a highly efficient retainer adapted to withstand the hard usage to which such devices are subjected.

While but one embodiment of the invention has been herein disclosed, it is to be understood that the invention is not confined to the specific details thereof but covers all adaptations and modifications within the scope of the appended claims.

I claim as my invention:

1. The combination with a percussive machine and a working tool having a collar, of a coupling device comprising a barrel nut secured to said machine and receiving the collared shank of the tool therewithin, said nut having at its outer end an inturned flange providing an opening of greater diameter than said collar, a split ring encircling the tool shank and engaging said flange to form an abutment for said collar, and means interposed between said machine and said ring for maintaining the latter rigidly in place.

2. The combination with a percussive machine and a working tool having a collar of a coupling device comprising a barrel nut secured to said machine and receiving the collared shank of the tool therewithin, said nut having at its outer end an inturned flange providing an opening of greater diameter than said collar, a split ring encircling the tool shank and engaging said flange to form an abutment for said collar, and a cylindrical spacer of greater diameter than said tool collar, clamped between said machine and said ring.

3. The combination with a percussive machine and a working tool having a collar, of a coupling device comprising a barrel nut secured to said machine and receiving the collared shank of the tool therewithin, said nut having at its outer end an inturned flange providing an opening of greater diameter than said tool collar, a split ring encircling the tool shank and engaging said flange to form an abutment for said collar, means interposed between said machine and said abutment ring for holding the latter against said flange, an elastic cushion encircling the tool shank between said collar and said abutment ring, and non-metallic washers closely engaging the tool shank at either end of said cushion to prevent excessive wear of the latter.

4. The combination with a percussive machine and a working tool having a collar, of a coupling device comprising a barrel nut secured to said machine and receiving the collared shank of the tool therewithin, said nut having at its outer end an inturned flange providing an opening of greater diameter than said tool collar, a split ring encircling the tool shank and engaging said flange to form an abutment for said collar, a cylindrical spacer of greater diameter than said tool collar clamped between said machine and said abutment ring within said nut for retaining said ring rigidly in place, an elastic cushion encircling said tool shank between said collar and abutment ring, and non-metallic washers filling with a close fit the space between the tool shank and said spacer at either end of said cushion to prevent fraying out of the latter.

5. The combination with a percussive machine and a working tool having a collar, of a coupling device comprising a barrel nut secured to said machine and receiving the collared shank of the tool therewithin, said nut having at its outer end an inturned flange providing an opening of greater diameter than said tool collar, a split ring encircling the tool shank and engaging said flange to form an abutment for said collar, a cylindrical spacer of greater diameter than said tool collar clamped between said machine and said abutment ring within said nut for retaining said ring rigidly in place, a cylindrical rubber cushion encircling said tool shank between said collar and abutment ring, and leather washers filling with a close fit the space between the tool shank and said spacer at either end of said cushion to prevent fraying out of the latter.

6. The combination with a percussive machine and a working tool having a collar, of a coupling device comprising a barrel nut adapted to be passed over the collared shank of the tool and to be secured to said machine, a two part ring arranged loosely to fit the tool shank beyond its collar and to prevent movement of the latter out of said nut, means maintaining said ring at a fixed distance from said machine, and cushioning means disposed between the tool collar and said ring.

7. The combination with a pneumatic hammer of a coupling device for retaining a working tool having a collar in operative relation thereto comprising a barrel nut secured to the hammer barrel and projecting therebeyond for receiving the collared shank of the tool, a two piece abutment ring encircling the tool shank, means maintaining said ring in said nut at a fixed distance from the end of said hammer barrel, a rubber cushion between the tool collar and said abutment ring, and means preventing fraying of the ends of said cushion.

8. The combination with a pneumatic hammer of a coupling device for retaining a working tool in operative relation thereto comprising a cylindrical member having end openings of greater diameter than the collar on the tool shank, one end being adapted to be secured to the hammer barrel, a removable abutment within said member beyond the tool collar, and means fixing the position of said abutment relative to the end of the hammer barrel to limit the movement of the collared shank within said member, said means including a spacer within said member abutting at its ends the hammer barrel and said abutment respectively.

9. A tool retaining coupling for percussive machines comprising a cylindrical member adapted to be secured to the percussive machine and to receive the shank of a working tool provided with a collar, a removable abutment for the tool collar within said member, means for maintaining said abutment at a fixed distance from the percussive machine including a spacer arranged to be clamped between said abutment and the machine, and shock absorbing means arranged for disposition between said abutment and the tool collar.

10. A tool retaining coupling for percussive machines comprising a cylindrical member adapted to be passed over the shank of a working tool provided with a collar and to be secured at one end to the percussive machine, a two piece abutment ring arranged to encircle the tool shank beyond its collar, a cylindrical spacer arranged to abut the end of the percussive machine to maintain said ring in fixed relation thereto, a cylindrical rubber cushion adapted to encircle the tool shank between its collar and said ring, and split washers of non-metallic material arranged to make a close fit with the tool shank and with said spacer to be positioned at each end of said cushion to prevent fraying and undue wear of the same.

Signed by me at Detroit, Michigan, this 29th day of April, 1924.

EDWARD W. STEVENS.